United States Patent [19]
French

[11] Patent Number: 6,029,297
[45] Date of Patent: Feb. 29, 2000

[54] MULTI-PURPOSE ELECTRICIAN PLIERS TOOL

[76] Inventor: Thomas J. French, 7408 N. Oconto Ave., Chicago, Ill. 60631

[21] Appl. No.: 09/100,599

[22] Filed: Jun. 19, 1998

[51] Int. Cl.[7] .................................................... B25B 1/00
[52] U.S. Cl. ........................................ 7/107; 7/127; 81/9.4
[58] Field of Search .............................. 7/107, 127, 132; 81/9.4

[56] References Cited

U.S. PATENT DOCUMENTS

| | | | |
|---|---|---|---|
| 3,005,366 | 10/1961 | Grimshaw et al. | 7/132 |
| 3,525,107 | 8/1970 | Hays | 7/107 |
| 3,654,647 | 4/1972 | Neff . | |
| 3,710,406 | 1/1973 | Stanford . | |
| 3,733,627 | 5/1973 | Epstein . | |
| 3,777,323 | 12/1973 | Ingram | 7/107 |
| 3,795,023 | 3/1974 | Miragliotta . | |
| 3,860,981 | 1/1975 | Mayer . | |
| 3,871,078 | 3/1975 | Ogle . | |
| 3,906,561 | 9/1975 | Bawa . | |
| 3,947,905 | 4/1976 | Neff | 7/107 |
| 4,104,752 | 8/1978 | Amrein et al. . | |
| 4,226,145 | 10/1980 | Gill . | |
| 4,229,849 | 10/1980 | Theiler, Sr. | 7/107 |
| 4,337,542 | 7/1982 | Theiler, Sr. | 7/107 |
| 4,366,730 | 1/1983 | Casadio . | |
| 4,607,544 | 8/1986 | Jewell, Jr. | 7/107 |
| 4,993,287 | 2/1991 | Carpenter et al. . | |
| 5,084,935 | 2/1992 | Kaithoff . | |
| 5,245,721 | 9/1993 | Lowe et al. . | |
| 5,280,659 | 1/1994 | Park . | |
| 5,347,670 | 9/1994 | Duguette et al. . | |
| 5,575,029 | 11/1996 | Simpson . | |
| 5,711,182 | 1/1998 | Yang . | |

*Primary Examiner*—David A. Scherbel
*Assistant Examiner*—Joni Danganan
*Attorney, Agent, or Firm*—Gillord, Krass, Groh, Sprinkle, Anderson & Citiowski, P.C.

[57] ABSTRACT

A multi-purpose electrician pliers tool having an elongate body with a forward end and a rearward end and constructed of a first member and a second member pivotally secured together by a pivot pin. The first and second members include forwardly extending and overlapping jaw portions on a forward side of the pivot pin and define therebetween a plurality of opposing and pivotally interengaging locations corresponding to a plurality of different wire fabricating features located on both forward and rearward sides of the pivot pin. The features of the tool include first and second planar splicing faces located at a forward end, first and second wire cutter portions established at a succeeding location on the forward side of the pivot pin, first and second crimping portions established at a further succeeding location on the rearward side of the pivot pin, first and second pluralities of wire stripper portions located at a yet further succeeding location on the rearward side and, finally, a first fish tape engaging portion and a second corresponding fish tape receiving portion established at a still further location on the rearward side of the pivot pin and capable of being actuated so as to sandwich therebetween a length of a fish tape reel. The plurality of different wire fabricating features provides a greater range of applications to the multi-purpose electrician's tool. The tool further includes the feature of a pair of wire curl holes located at an outwardly spaced position on each of the first and second members and so as to facilitate the bending of wire ends into curl shapes for securing to electrical leads. The first and second members terminate in arcuate shaped handle portions which extend in opposing fashion relative to each other.

3 Claims, 2 Drawing Sheets

MULTI-PURPOSE ELECTRICIAN PLIERS TOOL

BACKGROUND OF THE INVENTION

1. Field of the Invention

The present invention relates generally to multi-purpose pliers tools, particularly of the type utilized by electricians, and more particularly relates to a multi-purpose electrician pliers tool having a variety of different features which is an improvement over prior art electricians tools.

2. Description of the Prior Art

The prior art is well documented with combination pliers and wire stripper devices. Such devices are particularly useful to electricians who desire the capabilities of portable and compact multi-functioning tools during the performance of their tasks. This is made even more important by the fact that electricians must often work in fairly inaccessible locations, making the ability to carry around numerous different tools in a toolbox often impractical or impossible.

An example of a combination wire stripper and plier device is illustrated in U.S. Pat. No. 3,710,406, issued to Stanford, which teaches a device including a pair of handle members having cutting plates mounted at upper ends thereof. The cutting plates are secured to a rearward side of a pivot pin and are sized for different wire gauges. The Stanford device further includes an elongate and narrowed nose formed by the first and second jaw portions for gripping an end of a wire so as to curl it and a pair of cutters located just forwardly of the pivot pin. The drawback of the Stanford device is that the extreme narrowness of the first and second jaw portions are suited for only gripping a couple of wires at a time for splicing and that the limited capacity for accepting more wires limits its functionality.

U.S. Pat. No. 3,654,647, issued to Neff, teaches a combination wire working tool which includes a needle-nose plier jaws, a crimping orifice for crimping solderless electrical terminals to the ends of wire, cutter blades for cutting wire and a plurality of orifices for cutting and stripping insulation material from insulated wire of different diameters. The Greenlee fish tape reel disclosure illustrates a fish tape reel device which is used for pulling attached electrical wires through an electrical junction box and an internally hollowed conduit extending therefrom. At the end of the extending fish tape reel is a ring to which is attached the ends of the several wires.

The shortcoming of the prior art is that it has not, to date, been able to combine the features of a multi-functional electrician pliers device with a fish tape reel device into a workable tool, particularly owing to the difficulties in obtaining proper balancing of such a tool during translation of the fish tape reel.

SUMMARY OF THE PRESENT INVENTION

The present invention is a multi-purpose electrician pliers tool which provides a variety of different wire fabricating features and further, as is also not taught by the prior art, provides fish tape reel engaging and gripping capabilities for translating a fish tape reel through an internally hollowed electrical conduit. The tool includes an elongate body having a forward end and a rearward end and constructed of a first member and a second member pivotally secured together by a pivot pin. The first and second members include first and second forwardly extending and overlapping jaw portions at a point forward of the pivot pin and define therebetween a plurality of opposing and pivotally interengaging locations both forwardly and rearwardly of the pivot pin which correspond to a plurality of different wire fabricating features. The first and second members terminate at the rearward end in arcuate shaped handle portions which extend in opposing fashion relative to each other.

The wire fabricating features include first and second substantially rectangular shaped and planar splicing faces located on the forward side of the pivot pin and capable of splicing together any number of wires. Also included on the forward side are first and second wire cutter portions, each including an angled and straight edge for severing any gauge wire.

Located on the rearward side of the pivot pin connecting the first and second members together are first and second crimping portions and beyond that are first and second pluralities of semi-circular shaped and spaced apart wire stripper portions which are sized according to wire gauge and which sever the covering of the desired gauge wire. Located at a most rearwardly end of the pivot pin is a first fish tape engaging portion and a second fish tape receiving portion which is capable of being engaged by the first fish tape portion so as to sandwich therebetween a fish tape reel. The first fish tape engaging portion further includes a toothed portion with a downwardly engaging and striated end face which engages against a slotted reception portion.

As was previously described, the purpose of fish tape reel devices heretofore is to secure at the end of the reel a plurality of electrical wires (such as to a ring) and to pull the wires through an internally hollowed electrical conduit. The location of the fish tape reel engaging and receiving portions on the pliers tool of the present invention further facilitates greater gripping force and balance to the user by permitting the user to grasp the tool in a sideways fashion with one hand around the handles and the other grasping the tool head.

Additional inventive features of the pliers tool includes the provision of first and second wire curl holes formed through the first and second members, respectively, and so that a selected one of the holes are capable of receiving a length of wire with the insulation or covering stripped or removed therethrough so that, upon subsequent rotation of the tool about a longitudinal axis extending through a center of the tool, an end of the inserted wire is curled for appropriate attachment to an electrical lead, i.e. terminal screws on switches and outlets. The wire curl holes are further arranged at outward locations along the first and second members rearwardly of the pivot pin and extend along first and second axes parallel to an axis formed through the pivot pin.

BRIEF DESCRIPTION OF THE DRAWINGS

Reference will now be made to the attached drawings, when read in combination with the following specification, wherein like reference numerals refer to like parts throughout the several views, and in which.

DETAILED DESCRIPTION OF THE PREFERRED EMBODIMENTS

Figure 1:
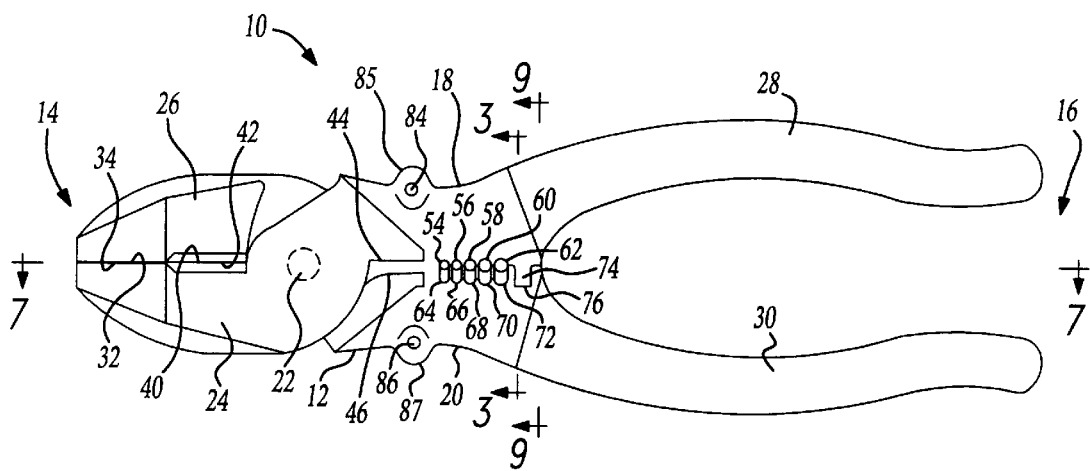
FIG. 1 is a planar front view of the multi-purpose electrician pliers tool with various wire fabrication features according to the present invention.

Referring to FIG. 1, the multi-purpose electrician pliers tool is illustrated at 10 according to the preferred embodiment of the present invention. The pliers tool 10 includes an elongate body 12 having a forward end 14 and a rearward end 16 and is constructed of a first member 18 and a second member 20 pivotally secured together by a pivot pin 22 (see FIG. 4). The first member 18 includes a forward extending jaw portion 24 and the second member 20 a forward extending jaw portion 26. The tool 10 is capable of being constructed by a variety of different materials, but is preferably of a steel construction.

Figure 4:
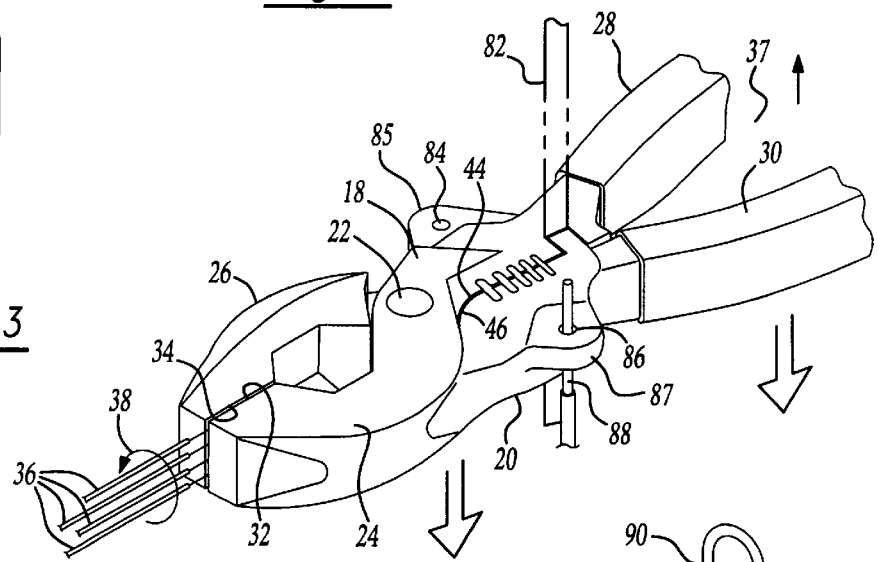
FIG. 4 is a perspective view of the multi-purpose electrician pliers tool illustrating in operative fashion both the fish tape reel and wire curl hole functions according to the present invention.

As is clearly shown in FIGS. 1 and 4, the forward extending jaw portions 24 and 26 are contoured in alternating, overlapping and opposing fashion relative to their respective elongate body members 18 and 20 and in a direction from a rearward end to a forward end of the pivot pin 22 and so that the elongate members 18 and 20 and forward extending jaw portions 24 and 26 define a plurality of opposing and pivotally interengaging locations corresponding to a plurality of different wire fabricating features as will be subsequently described in more detail. The first and second members 18 and 20 further terminate at the rearward end 16 in arcuate shaped handle portions 28 and 30 which extend in opposing fashion relative to each other.

The plurality of opposing and interengaging locations include a first planar and substantially rectangular shaped splicing face 32 of the first jaw portion 24 and a second likewise planar and substantially rectangular shaped splicing face 34 of the second jaw portion 26 which are arranged at a first longitudinal location of the interengaging locations and on the forward side of the pivot pin 22. As is best shown in FIG. 4, the dimensioning of the planar splicing faces 32 and 34 in rectangular form is so that they will provide a maximum of gripping and fabricating surface area for working with a number of wires. As is shown in FIG. 4, a plurality of four wires 36 are gripped by and extending from the planar splicing faces 32 and 34. Upon squeezing the handles 28 and 30 together and twisting in a rotating fashion illustrated by circular arrow 38 (which is established by a longitudinal axis 37 extending through a center of the tool 10) a number of these wires 36 may be spliced together. This is an improvement over the prior art splicing pliers, particularly needle-nose pliers, in which the surface areas of the gripping jaw portions is considerably less.

Arranged at a second longitudinal location on the forward side of the pivot pin 22 is a first wire cutter portion 40 associated with the first jaw 24 and a second and interengaging wire cutter portion 42 associated with the second jaw 26. The wire cutter portions 40 and 42 include angled and sharp edged cutting portions which are sufficient for severing any gauge wire with which the electrician may be working.

Figure 6:
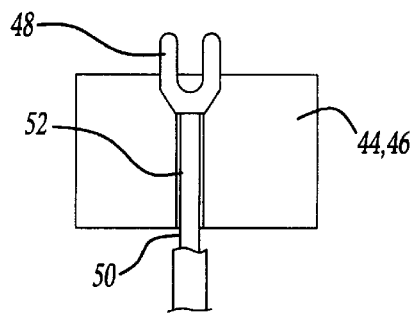
FIG. 6 is a view of a crimped wire connector stakon secured to an end of a wire as fabricated by the first and second crimping portions on the multi-purpose tool according to the present invention.

Positioned at the next succeeding longitudinal location is the pivot pin 22 and on the rearward side of the pin 22 is located a first crimping portion 44 associated with the first member 18 and a second and interengaging crimping portion 46 associated with the second member 20. With reference further to FIG. 6, the purpose of the wire crimping portions 44 and 46 is to fixedly secure a crimping stakon 48 to an exposed and stripped end of a wire 50 and which is accomplished by compressing an internally hollowed and extending tube portion 52 of the stakon 48 which is secured over the exposed end of the wire 50 between the crimping portions (illustrated schematically as 44 and 46 in FIG. 6) so as to fixedly secure the stakon 48 to the wire 50.

Figure 7:
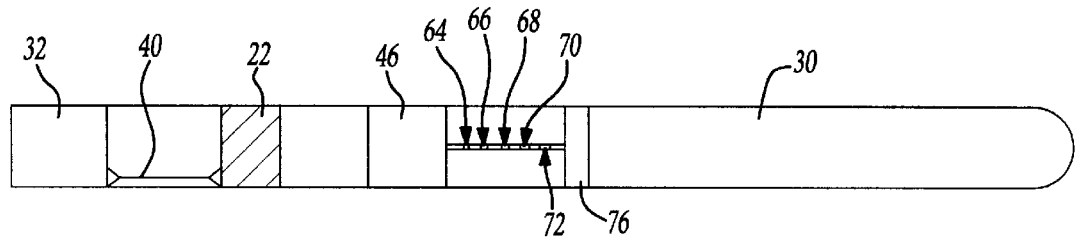
FIG. 7 is a cutaway view taken along line 7—7 of FIG. 1 and illustrating the various interengaging wire fabricating locations according to the multi-purpose electrician pliers tool according to the present invention.
Figure 9:
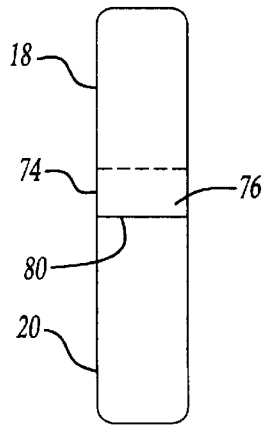
FIG. 9 is an end view taken along line 9—9 of FIG. 1 and illustrating a second cross sectional view of the fish tape reel engaging and receiving portions according to the present invention.

Referring again to FIGS. 1 and 4, and further to FIGS. 7 and 9, a first plurality of semi-circular shaped and spaced apart wire strippers are arranged along the first member 18 at a next succeeding longitudinal location on the rearward side of the pivot pin 22 and are illustrated by first semi-circular portion 54, second semi-circular portion 56, third semi-circular portion 58, fourth semi-circular portion 60 and fifth semi-circular portion 62. A second plurality of semi-circular shaped and spaced apart wire strippers are arranged along a corresponding location of the second member 20 and are illustrated by first semi-circular portion 64, second semi-circular portion 66, third semi-circular portion 68, fourth semi-circular portion 70 and fifth semi-circular portion 72. As is best illustrated in FIG. 1, the covering layers of different gauge wires are capable of being stripped by the interengaging pairs of semi-circular shaped wire stripper portions 54 and 64, 56 and 66, 58 and 68, 60 and 70 and 62 and 72 and these may correspond to wire gauge sizes 10, 12, 14, 16 and 18, respectively.

Figure 8:
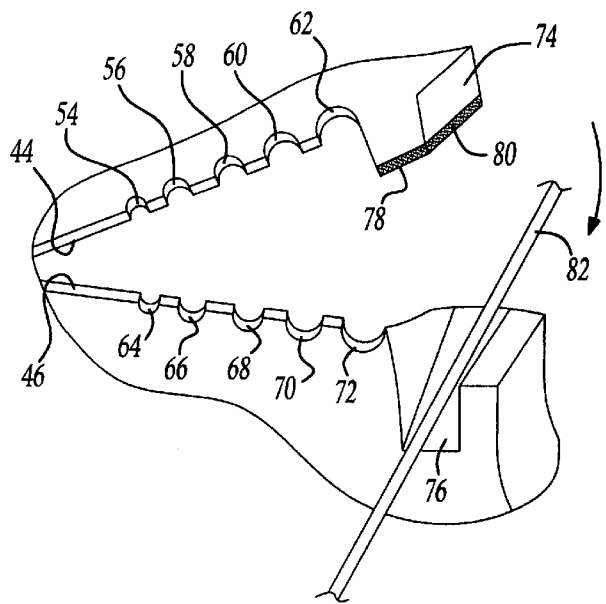
FIG. 8 is a sectional view in perspective of first and second pluralities of semi-circular shaped and spaced apart wire strippers and the fish tape engaging and receiving portions for sandwiching therebetween a length of fish tape reel according to the present invention.

A final interengaging location is established at a further longitudinal position beyond the wire strippers on the rearward side of the pivot pin 22 and is provided by a first fish tape engaging portion 74 associated with the first member 18 and a second fish tape receiving portion 76 associated with the second member 20. With specific reference to FIG. 8, the fish tape engaging portion 74 is in the form of a toothed portion and the fish tape receiving portion 76 a slotted reception portion. The fish tape engaging portion 74 further includes an end face 78 having formed thereon a plurality of striated surfaces 80, the purpose for which is to provide enhanced gripping power for pulling a length of fish tape reel 82 upon pivoting of the first and second handle portions 28 and 30 towards each other to grip the tape reel 82 (see FIG. 4).

As has been previously explained and is known in the art, fish tape reel is used to feed through long lengths of internally hollowed electrical pipe conduit and to secure at an end thereto any number of electrical wires which it is desirable to pull in a reverse fashion through the wires. Owing the to the often convoluted nature and elongate lengths of conventional piping networks, it is often necessary to apply a significant degree of pulling force to the fish tape reel in order to successfully navigate the conduit and to effectively pull the electrical wires through the opposite end. The arrangement of the fish tape engaging and receiving portions 74 and 76 along the longitudinal length of the tool 10 of the present invention is particularly suited for this feature due to its location providing for even weighting of the tool.

Accordingly, a user can effectively utilize the fish tape gripping feature of the tool 10 according to the invention by rotating the tool to a sideways position, gripping a first hand (not shown) around the handle portions 28 and 30 and gripping the second hand (also not shown) around the closed jaw portions 24 and 26. In this manner, the combination of the location of the fish tape reel gripping portions 74 and 76, the even weighting of the tool 10 on both forward and reverse sides of the gripping portions 74 and 76, and the degree of gripping and pulling forces which may be applied, all combine to provide an enhanced degree of pulling forces and are not taught or suggested by any prior art electrician pliers device.

Figure 2:
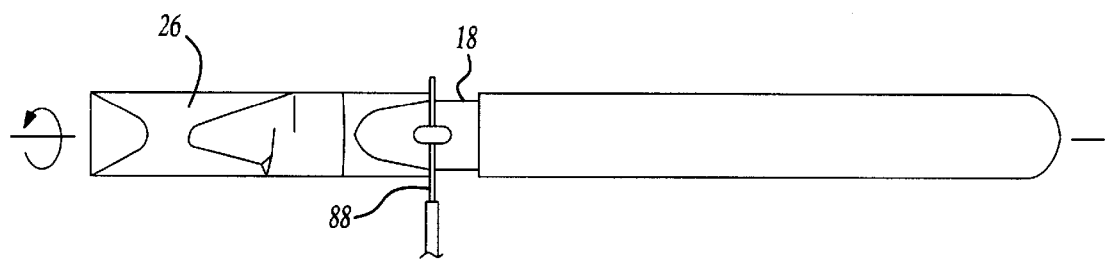
FIG. 2 is a top view of the illustration shown in FIG. 1 and further showing the ability of the wire curl holes to receive therethrough an end of a wire to be curled.
Figure 3:
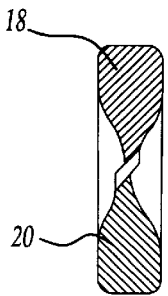
FIG. 3 is a cutaway view taken along line 3—3 of FIG. 1 and illustrating a first cross sectional view of the multi-purpose electrician pliers tool according to the present invention.
Figure 5:
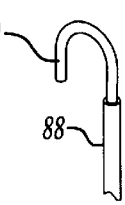
FIG. 5 is a view of an end of a specified gauge wire which has been curled by means of a wire curl hole according to the multi-purpose electrician pliers tool according to the present invention.

A final wire fabricating feature is provided by the multi-purpose tool 10 of the present invention and is in the form of a first wire curl hole 84 formed through the first member 18 and a second wire curl hole 86 formed through the second member 20. The wire curl holes 84 and 86 are arranged at outward locations along the first and second members 18 and 20 (as evidenced by the lateral raised portion 85 and 87) and are capable of receiving in inserting fashion an end length of a wire to be curled (see wire 88 in FIGS. 2 and 4). By rotating the tool about its longitudinal axis 37 (see again FIG. 2) the exposed wire end is curled to a shape illustrated at 90 in FIG. 5 and so that the wire may be secured to an appropriate electrical lead.

Accordingly, the multi-purpose electrician pliers tool according to the present invention provides a wide array of electrical wire fabricating features and, further, an effective fish tape reel gripping feature for pulling a length of tape reel through an electrical conduit system. Additional embodiments will become apparent to those skilled in the art to which it pertains and without deviating from the scope of the appended claims.

I claim:

1. A multi-purpose electrician pliers tool, comprising:

an elongate body having a forward end and a rearward end and constructed of a first member and a second member pivotally secured to said first member by a pivot pin, said first member including a first forward extending jaw portion and said second member including a second forward extending and overlapping jaw portion on a forward side of said pivot pin, said first and second members and said overlapping jaw portions defining therebetween a plurality of opposing and pivotally interengaging locations corresponding to a plurality of different wire fabricating features, said first and second members terminating at said rearward end in pivotally associated and arcuate shaped handle portions which extend in opposing fashion relative to each other, said interengaging locations further comprising:

a first planar and substantially rectangular splicing face at a first longitudinal location along said first jaw portion of said first member and on said forward side of said pivot pin, a second planar and substantially rectangular splining face at a corresponding location along said second overlapping jaw portion of said second member;

a first wire cutter portion at a second longitudinal location along said first jaw portion of said first member and on said forward side of said pivot pin, a second wire cutter portion at a corresponding location along said second jaw portion of said second member;

a first crimping portion at a third longitudinal location along said first member and on a rearward side of said pivot pin, a second crimping portion at a corresponding location along said second member;

a first plurality of semi-circular shaped and spaced apart wire stripper portions at a fourth longitudinal location along said first member and on said rearward side of said pivot pin, a second plurality of semi-circular shaped and spaced apart wire stripper portions at a corresponding location along said second member;

a first fish tape engaging portion at a fifth longitudinal location along said first member and on said rearward side of said pivot pin, a second fish tape receiving portion at a corresponding location along said second member and capable of being engaged by said first fish tape engaging portion so as to sandwich a length of fish tape reel therebetween; and a first wire curl hole formed through said first member and a second wire curl hole formed through said second member, at least one of said wire curl holes receiving a length of wire therethrough so that, upon subsequent rotation of said tool about a longitudinal axis extending through a center of said tool, an end of the inserted length of wire is curled, said first wire curl hole being arranged within a first lateral raised portion along said first member, said second wire curl hole being arranged within a second lateral raised portion along said second member, said wire curl holes being positioned on said rearward side of said pivot pin and extending along first and second axes parallel to an axis formed through said pivot pin;

said plurality of different wire fabricating features providing a greater range of applications to said multi-purpose tool and said location and arrangement of said fish tape engaging and receiving portions providing enhanced grip and balance to a user during pulling of the fish tape reel through an internally hollowed pipe conduit.

2. The multi-purpose electrician pliers tool according to claim 1, said first and second pluralities of semi-circular shaped wire stripper portions further comprising a first ten gauge wire stripper, a second twelve gauge wire stripper, a third fourteen gauge wire stripper, a fourth sixteen gauge wire stripper and a fifth eighteen gauge wire stripper.

3. A multi-purpose electrician pliers tool, comprising:

an elongate body having a forward end and a rearward end and constructed of a first member and a second member pivotally secured to said first member by a pivot pin, said first member including a first forward extending jaw portion and said second member including a second forward extending and overlapping jaw portion on a forward side of said pivot pin, said first and second members and said overlapping jaw portions defining therebetween a plurality of opposing and pivotally interengaging locations corresponding to a plurality of different wire fabricating features, said first and second members terminating at said rearward end in pivotally associated and arcuate shaped handle portions which extend in opposing fashion relative to each other, said interengaging locations further comprising:

a first planar and substantially rectangular splicing face at a first longitudinal location along said first jaw portion of said first member and on said forward side of said pivot pin, a second planar and substantially rectangular splicing face at a corresponding location along said second overlapping jaw portion of said second member;

a first wire cutter portion at a second longitudinal location along said first jaw portion of said first member and on said forward side of said pivot pin, a second wire cutter portion at a corresponding location along said second jaw portion of said second member;

a first crimping portion at a third longitudinal location along said first member and on a rearward side of said pivot pin, a second crimping portion at a corresponding location along said second member;

a first plurality of semi-circular shaped and spaced apart wire stripper portions at a fourth longitudinal location along said first member and on said rearward side of said pivot pin, a second plurality of semi-circular shaped and spaced apart wire stripper portions at a corresponding location along said second member; and a first fish tape engaging portion at a fifth longitudinal location along said first member and on said rearward side of said pivot pin, a second fish tape receiving portion at a corresponding location along said second member and capable of being engaged by said first fish tape engaging portion so as to sandwich a length of fish tape reel therebetween, said first fish tape engaging portion further comprising a toothed portion and said second fish tape receiving portion further comprising a slotted reception portion, said toothed portion further comprising a downwardly engaging end face having a plurality of striated surfaces formed thereon;

said plurality of different wire fabricating features providing a greater range of applications to said multi-purpose tool and said location and arrangement of said fish tape engaging and receiving portions providing enhanced grip and balance to a user during pulling of the fish tape reel through an internally hollowed pipe conduit.

\* \* \* \* \*